United States Patent
Kim et al.

(10) Patent No.: US 12,351,477 B2
(45) Date of Patent: Jul. 8, 2025

(54) PROCESS FOR PREPARING A POSITIVE ELECTRODE MATERIAL FOR RECHARGEABLE LITHIUM ION BATTERIES

(71) Applicant: UMICORE, Brussels (BE)

(72) Inventors: Dae-Hyun Kim, Chungcheongnam-do (KR); Jens Paulsen, Chungcheongnam-do (KR); Kasper Lambrighs, Brussels (BE); Randy De Palma, Brussels (BE); Liang Zhu, Brussels (BE)

(73) Assignee: UMICORE, Brussels (BE)

( * ) Notice: Subject to any disclaimer, the term of this patent is extended or adjusted under 35 U.S.C. 154(b) by 787 days.

(21) Appl. No.: 17/642,034

(22) PCT Filed: Sep. 11, 2020

(86) PCT No.: PCT/EP2020/075538
§ 371 (c)(1),
(2) Date: Mar. 10, 2022

(87) PCT Pub. No.: WO2021/048399
PCT Pub. Date: Mar. 18, 2021

(65) Prior Publication Data
US 2023/0202865 A1 Jun. 29, 2023

(30) Foreign Application Priority Data
Sep. 13, 2019 (EP) .................... 19197345

(51) Int. Cl.
*H01M 10/0525* (2010.01)
*C01G 53/50* (2025.01)
*C01G 53/82* (2025.01)

(52) U.S. Cl.
CPC ............ *C01G 53/50* (2013.01); *C01G 53/82* (2025.01); *H01M 10/0525* (2013.01); *C01P 2002/60* (2013.01); *C01P 2006/40* (2013.01)

(58) Field of Classification Search
CPC ... H01M 10/0525; C01G 53/82; C01G 53/50; C01P 2002/60; C01P 2006/40
See application file for complete search history.

(56) References Cited

U.S. PATENT DOCUMENTS

| | | |
|---|---|---|
| 2015/0155548 A1 | 6/2015 | Ryoshi et al. |
| 2017/0062818 A1 | 3/2017 | Ogata et al. |
| 2021/0066715 A1 | 3/2021 | Nakayama et al. |

FOREIGN PATENT DOCUMENTS

| | | |
|---|---|---|
| EP | 2202828 A1 | 6/2010 |
| EP | 2523240 A1 | 11/2012 |
| EP | 3054508 A1 | 8/2016 |
| JP | 2009032647 A | 2/2009 |
| JP | 2015026456 A | 2/2015 |
| JP | 201892898 A | 6/2018 |
| WO | 2011108657 A1 | 9/2011 |
| WO | 2013183711 A1 | 12/2013 |
| WO | 2015129187 A1 | 9/2015 |
| WO | 2015189740 A1 | 12/2015 |
| WO | 2018158078 A1 | 9/2018 |
| WO | 2019087558 A1 | 5/2019 |
| WO | 2019120973 A1 | 6/2019 |

OTHER PUBLICATIONS

ISA/EP; International Search Report and Written Opinion for International Patent Application No. PCT/EP2020/075538 dated Dec. 14, 2020, 11 pages.
Schmuch et al., "Performance and cost of materials for lithium-based rechargeable automotive batteries", Nature Energy, Apr. 2018, vol. 3, 13 pages.

*Primary Examiner* — Jane J Rhee
(74) *Attorney, Agent, or Firm* — NK Patent Law

(57) ABSTRACT

The present invention provides a process is presented for preparing a positive electrode active material for rechargeable lithium ion batteries. The process comprises a sintering step having a short sintering time. This improves the production throughput. More particularly, the process applies to positive electrode active material powders having a general formula $Li_{(1+a)}(Ni_xMn_yCo_zMe_c)_{(1-a)}O_2$, wherein Me comprises at least one element of the group consisting of Al, Mg, Ti, Zr, W, Nb, B, and Sr, with $-0.1 \leq a \leq 0.1$, $0.33 \leq x \leq 0.95$, $0 \leq y \leq 0.35$, $0 < z \leq 0.35$, $0 \leq c \leq 0.05$, and $x+y+z+c=1$. The sintering step is performed for a predefined sintering time $t_s$, expressed in hours, and at a predefined temperature $T_s$, expressed in °C., such that $0.3 \leq t_s \leq 6.0$, and $1140 + 50 \log_{10}(6/t) - 580 \, x \leq T_s \leq 1245 + 50 \log_{10}(6/t_s) - 580 \, x$.

15 Claims, No Drawings

PROCESS FOR PREPARING A POSITIVE ELECTRODE MATERIAL FOR RECHARGEABLE LITHIUM ION BATTERIES

CROSS-REFERENCE TO RELATED APPLICATIONS

This application is a U.S. National Stage application of International Patent Application No. PCT/EP2020/075538, filed on Sep. 11, 2020, which claims the benefit of European Patent Application No. 19197345.2, filed on Sep. 13, 2019.

TECHNICAL FIELD

The present invention relates to process for preparing a positive electrode material for lithium-ion batteries having an ultra-short sintering time as well as a reduced overall energy input, while also preserving the electrochemical performances of the product.

Introduction

This invention relates to a process for preparing powderous positive electrode active material for rechargeable lithium ion batteries. More particularly, the process comprises a sintering step having a short sintering time. This improves the production throughput.

According to Schmuch et al. (Nature Energy, 2018, Vol. 3, pp. 267-278, FIG. 7), positive electrode active material based on lithium nickel manganese cobalt metal oxide (referred to as NMC hereafter) make up roughly 50% of the price of lithium ion batteries. It is therefore important to render the manufacturing process of such materials as cost-effective as possible.

WO 2018/158078 A1 describes state of the art industrial processes for manufacturing powderous NMC material. Manufacturing Example 1 describes a conventional direct-firing process wherein a mixture of transition metal hydroxide powders and Li bearing powder is heated up to more than 800° C. for more than 10 hours. Manufacturing Example 3 teaches a double-firing process. Both examples illustrate the limitation of the production throughput due to a long sintering time of more than 10 hours.

A complete firing process typically comprises a heating step, a reaction step, a sintering step, and a cooling step. As illustrated above, the bottleneck is the sintering step, as a residence time of more than 10 hours is normally required. It has now been determined that this long residence time is mainly caused by the low thermal conductivity of NMC powders, in combination with the requirement to have a homogeneous temperature throughout the bulk of the product.

EP 3054508 describes processes for preparing cathode active materials wherein lithium hydroxide hydrate was added to a hydroxide precursor to prepare a mixed powder of which the molar ratio of Li: (Ni, Co, Mn) was 101:99. The powder was molded and the temperature was elevated from ordinary temperature to 750° C. under normal pressure in an air atmosphere over 10 hours, and the pellet was sintered at 750° C. for 4 hours. After sintering, the heater was turned off, and the mixture was naturally cooled as it was left standing in the furnace allowing the temperature of the furnace to decrease to about 200° C. after 5 hours. After allowing to cool for another 24 hours the temperature of the furnace was 100° C. or lower, and crushed.

EP 2523240 discloses a material which, when used as a positive-electrode material for lithium secondary battery, brings about a reduction, in cost, an increase in safety, and an increase in load characteristics and further brings about an improvement in high-voltage characteristics and an improvement in powder handleability due to an improvement in bulk density. The technology relates to a lithium-transition metal compound powder for a positive-electrode material for lithium secondary battery, which comprises: secondary particles that are configured of primary particles having two or more compositions; and a lithium-transition metal compound having a function of being capable of insertion and release of lithium ions, wherein the powder gives a pore distribution curve having a peak at a pore radius of 80 nm or greater but less than 800 nm, and the secondary particles includes primary particles of a compound represented by a structural formula that includes at least one element selected from the group consisting of As, Ge, P, Pb, Sb, Si, and Sn, in which the primary particles of the compound are present at least in an inner part of the secondary particles.

EP 2202828 describes a lithium transition metal-based compound powder for a lithium secondary battery positive electrode material that can achieve both improvements of load characteristics such as rate and output characteristics and a higher density is a lithium transition metal-based compound powder containing, as a main component, a lithium transition metal-based compound that has a function of allowing elimination and insertion of lithium ions, and including a crystal structure belonging to a layer structure, wherein primary particles are aggregated to form secondary particles, the ratio A/B of a median diameter A of the secondary particles to an average diameter (average primary particle diameter B) is in the range of 8 to 100, and 0.01 ⋈ FWHM(110) ⋈ 0.5 where FWHM(110) is the half width of a (110) diffraction peak present near a diffraction angle 2 of 64.5° in a powder X-ray diffraction analysis using a CuK±line.

Insufficient sintering times or temperatures indeed lead to poor electrochemical performances of the batteries due to either an insufficient crystallite size or an inhomogeneous growth of primary particles.

SUMMARY OF THE INVENTION

The current invention provides in a solution for at least one of the above mentioned problems by providing a process for preparing a positive electrode material for rechargeable lithium ion batteries, as described in claim 1. Such processes advantageously have an ultra-short sintering time as well as a reduced overall energy input, while also preserving the electrochemical performances of the product. At the same time, the invention provides a process that improves the production throughput.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints. All percentages are to be understood as percentage by weight, abbreviated as "wt. %" or as volume percent, abbreviated as "vol. %", unless otherwise defined or unless a different meaning is obvious to the person skilled in the art from its use and in the context wherein it is used.

Process

In a first aspect, the present invention provides a process for preparing a positive electrode material for lithium-ion batteries comprising the steps of:

step (i) heating a mixed metal compound pM comprising lithium, nickel and at least one metal selected from cobalt, manganese and aluminium or a first mixture M1 comprising A1: a mixed metal compound P1 comprising nickel and at least one metal selected from cobalt, manganese and aluminium and B1: a lithium compound L1, in a furnace from a temperature below 200° C. to a temperature $T_s$;

step (ii) subjecting said mixed metal compound pM or said first mixture to a heat treatment at said temperature $T_s$ for a period of time $t_s$ of 0.3 h to 6.0 h, thereby obtaining a heat-treated mixed metal compound M; whereby said temperature $T_s$ and said period of time $t_s$ relate according to formula: $1140+50l \cdot \log_{10}(6/t_s) - 580 \cdot x \leq T_s \leq 1200$, wherein x is a fraction by atom of nickel, relative to the total amount of nickel, cobalt, manganese and aluminium in said mixed metal compound pM or in said first mixture, wherein $0.30 \leq x \leq 0.99$, and whereby 300° C.h $\leq T_s \cdot t_s <$ 3000° C.h;

step (iii) cooling said heat-treated mixed metal compound M obtained from step (ii);

whereby a total period of time for step (i) and step (ii) is between 0.3 hours and 12.0 hours.

The present invention provides a process to prepare positive electrode active materials having an ultra-short sintering time as well as a reduced overall energy input, while also preserving the electrochemical performances of the product. At the same time, the invention provides a process that improves the production throughput.

Preferably, the present invention provides a process according to the first aspect of the invention, whereby a total period of time for step (i) and step (ii) is between 0.5 h and 8.0 h, preferably between 1.0 h and 6.0 h, more preferably between 1.0 h and 3.0 h and even more preferably between 1.0 h and 2.5 h. Most preferably, the total period of time for step (i) and step (ii) is between 1.0 h and 2.0 h and period of time $t_s$ for said sintering step (ii) is from 0.3 h to 1.5 h. Especially preferred, period of time $t_s$ for said sintering step (ii) is between 0.5 h and 3.0 h, and even between 0.5 h and 2.0 h.

Preferably, the present invention provides a process according to the first aspect of the invention, wherein, in step (ii), 300° C.h $\leq T_s \cdot t_s \leq$ 2800° C.h, preferably 300° C.h $\leq T_s \cdot t_s \leq$ 2700° C.h, more preferably 300° C.h $\leq T_s \cdot t_s \leq$ 2600° C.h, most preferably 300° C.h $\leq T_s \cdot t_s \leq$ 2400° C.h.

More preferably, the present invention provides a process according to the first aspect of the invention, wherein, in step (ii), 300° C.h $T_s \cdot t_s \leq$ 1600° C.h, preferably wherein 300° C.h $\leq T_s \cdot t_s \leq$ 1000° C.h, and more preferably wherein 300° C.h $\leq T_s \cdot t_s \leq$ 600° C.h.

Preferably, the present invention provides a process according to the first aspect of the invention, whereby a period of time $t_H$ for heating said mixed metal compound pM, in step (i), from a temperature below 200° C., preferably below 100° C. and more preferably at room temperature, to a sintering temperature $T_s$ is between 0.3 h and 6 h, and preferably between 0.5 h and 2 h. Preferably, said mixed metal compound pM is heated in step (i) at a heating rate of at least 5° C./min., preferably at least 8° C./min. and more preferably at least 10° C./min. Faster heating rates allow for higher throughput. Preferably, said compound is heated at a rate of at most 50° C./min., preferably at most 25° C./min. Lower heating rates allow for limiting differences in temperature within the mixed metal compound pM material layer.

Preferably, the present invention provides a process according to the first aspect of the invention, whereby said mixed metal compound pM is obtained by heating a second mixture (M2) comprising A2: a mixed metal compound P2 comprising nickel and at least one metal selected from cobalt, manganese and aluminium and B2: a lithium compound L2; and whereby said mixture is heat treated at a temperature $T_I$ of 400° C. to 1200° C. for a period of time $t_I$ of 1 h to 24 h, preferably at a temperature $T_I$ of 600° C. to 1000° C. for a period of time $t_I$ of 2 h to 10 h, and more preferably for a period of time $t_I$ of 2 h to 6 h.

More preferably, said mixed metal compound pM is provided as a mixture comprising one or more mixed metal compounds pM as described herein and one or more lithium compounds L. Preferably, said mixed metal compound pM is mixed with a lithium compound L in predetermined amounts prior to said heat treatment to form a mixture, and whereby a cathode active material according to the general formula $Li_{1+a}M'_{1-a}O_2$ is formed upon heat treatment of said mixture, wherein a is from −0.5 to 0.5, preferably from −0.2 to 0.2, more preferably from −0.1 to 0.1, and most preferably from −0.05 to 0.05, and wherein M' is the cationic part of a mixed metal compound as described herein. Preferably, the mixed metal compound pM is mixed, preferably in a dry mixing step, with at least one lithium compound. Said lithium compound is preferably selected from $Li_2O$, $LiOH$, and $Li_2CO_3$, each as such or as a hydrate thereof, for example $LiOH \cdot H_2O$. Combinations of two or more of said lithium compounds are feasible as well. Examples of suitable apparatuses for mixing mixed metal compound pM and lithium compound are tumbler mixers, plough-share mixers and free fall mixers. After the heat treatment step of the inventive process, the particulate material can be easily removed from the support, and subjected to further process steps, for example cooling, sieving or combinations of crushing and sieving of the product.

In a preferred embodiment, the present invention provides a process according to the first aspect of the invention, whereby said mixture further comprises a compound selected from metal oxides, metal hydroxides and metal oxyhydroxides of Zr, Ti, W and especially Al.

Preferably, the present invention provides a process according to the first aspect of the invention, whereby said heat-treated mixed metal compound M obtained from step (ii) is evacuated from said furnace prior to step (iii). This allows for faster cooling and higher throughput in production. Preferably, the present invention provides a process according to the first aspect of the invention, whereby said heat-treated mixed metal compound M obtained from step (ii) is cooled at an average cooling rate between 2° C./min. and 100° C./min., preferably at a cooling rate higher than 4° C./min. and more preferably at a cooling rate higher than 10° C./min.

Preferably, the present invention provides a process according to the first aspect of the invention, whereby said mixed metal compound pM is provided in step (i) as a powder. Preferably, said powder has a general formula $Li_{(1+a)}(Ni_xMn_yCo_zMe_c)_{(1-a)}O_2$ and has crystallinity lower than 70 nm, preferably lower than 50 nm.

Preferably, the present invention provides a process according to the first aspect of the invention, whereby said sintering temperature $T_s \leq 1745+50\cdot\log_{10}(6/t_s)-580\cdot x$, preferably whereby said $T_s \leq 1445+50\cdot\log_{10}(6/t_s)-580\cdot x$, and more preferably whereby said $T_s \leq 1345+50\cdot\log_{10}(6/t_s)-580\cdot x$. Most preferably, said sintering temperature $T_s \leq 1245+50\cdot\log_{10}(6/t_s)-580\cdot x$.

Preferably, the present invention provides a process according to the first aspect of the invention, whereby said sintering temperature is according to $1170+50\cdot\log_{10}(6/t_s)-580\cdot x \leq T_s$, preferably according to $1200+50\cdot\log_{10}(6/t_s)-580\cdot x \leq T_s$.

Preferably, the present invention provides a process according to the first aspect of the invention, for the preparation of positive electrode active material powder having a crystallite size between 34 nm and 46 nm are obtained.

Preferably, the present invention provides a process according to the first aspect of the invention, for preparing a positive electrode active material powder having a general formula $Li_{(1+a)}(Ni_xMn_yCo_zMe_c)_{(1-a)}O_2$, wherein Me comprises at least one element of the group consisting of Al, Mg, Ti, Zr, W, Nb, B, and Sr, with $-0.1 \leq a \leq 0.1$, $0.33 \leq x \leq 0.95$, $0 \leq y \leq 0.35$, $0 \leq z \leq 0.35$, $0 \leq c \leq 0.05$, and $x+y+z+c=1$, said process comprising a sintering step having a predefined sintering time and a predefined sintering temperature, wherein the predefined time t, expressed in hours, is $0.3 \leq t \leq 6.0$, and the predefined temperature T, expressed in ° C., is $1140+50 \text{ Log}_{10} (6/t)-580 \text{ } x \leq T \leq 1245+50 \text{ Log}_{10} (6/t)-580 \text{ } x$. Preferably, the present invention provides a process according to the first aspect of the invention, wherein the predefined time t, expressed in hours, is 0.5 t 5.0. Preferably, the present invention provides a process according to the first aspect of the invention, for preparing positive electrode active material powder having a general formula $Li_{(1+a)}(Ni_xMn_yCo_zMe_c)_{(1-a)}O_2$, wherein $-0.01 \leq a \leq 0.05$, $0.60 \leq x \leq 0.95$, $0 \leq y \leq 0.20$, $0 \leq z \leq 0.20$, $0 \leq c \leq 0.05$, and $x+y+z+c=1$, and wherein the predefined temperature T, expressed in ° C., is $1175+50 \text{ Log}_{10} (6/t)-580 \text{ } x \leq T \leq 1245+50 \text{ Log}_{10} (6/t)-580 \text{ } x$. Preferably, the present invention provides a process according to the first aspect of the invention, for the preparation of positive electrode active material powder having a crystallite size between 34 nm and 46 nm are obtained.

Mixed Metal Compound pM

In one embodiment, the present invention provides a process according to the first aspect of the invention, whereby said mixed metal compound pM is provided in step (i) in the form of a granular material such as powders or in the form of pellets having a dimension of 0.5 mm to 10.0 mm, preferably from 1.0 mm to 5.0 mm.

In a preferred embodiment, the present invention provides a process according to the first aspect of the invention, whereby said mixed metal compound pM is comprised of a particulate material with a median particle size d50 of at most 100 μm, as determined by laser particle size distribution measurement method, preferably at most 50 μm, more preferably between 0.5 μm to 25.0 μm and most preferably between 1 μm and 15 μm. In one preferred embodiment of the present invention, the mean particle diameter (d50) of said mixed metal compound pM is in the range of from 4 to 14 μm, preferably between 7 and 10 μm. The median particle size (PD50 or d50) of the compound is obtained by a laser particle size distribution measurement method. In this description, the laser particle size distribution is measured using a Malvern Mastersizer 2000 with Hydro 2000MU wet dispersion accessory, after dispersing the powder in an aqueous medium. In order to improve the dispersion of the powder in the aqueous medium, sufficient ultrasonic irradiation, typically 1 minute for an ultrasonic displacement of 12, and stirring, are applied and an appropriate surfactant is introduced.

In a preferred embodiment, the present invention provides a process according to the first aspect of the invention, whereby said mixed metal compound pM is comprised of a particulate material and is provided with an apparent density higher than 0.4 g/cm³, preferably with a density higher than 0.6 g/cm³, preferably with a density higher than 0.8 g/cm³, preferably with a density higher than 1.0 g/cm³, preferably with a density higher than 1.4 g/cm³, and even higher than 1.5 g/cm³. Preferably, said mixed metal compound pM is comprised of a particulate material and is provided with a density less than 2.3 g/cm³, preferably with a density less than 2.1 g/cm³, and even less than 2.0 g/cm³.

The present invention provides a process according to the first aspect of the invention, whereby said mixed metal compound pM comprises lithium, nickel and at least one metal selected from cobalt, manganese and aluminium. In a preferred embodiment, said mixed metal compound pM comprises Ni in an amount of at least 50 mol. %, relative to the total content of nickel, cobalt, manganese and aluminium in said mixed metal compound pM, preferably at least 60 mol. % and more preferably in an amount of 60 mol. % to 99 mol. %. Most preferably, said mixed metal compound pM comprises Ni in an amount of 60 mol. % to 95 mol. %, and even more preferably in an amount of 80 mol. % to 95 mol. %, such as 80 mol. %, 85 mol. %, 90 mol. % and 95 mol. %, and all values there in between.

In a preferred embodiment, the present invention provides a process according to the first aspect of the invention, whereby said mixed metal compound pM comprises a mixed metal hydroxide, carbonate, oxyhydroxide and/or oxide, and wherein said mixed metal compound pM preferably further comprises one or more metals selected from Ba, Al, Ti, Zr, W, Fe, Cr, Mo, Nb, Mg and V, more preferably from Al, Ti, Zr, W and Mg.

In one preferred embodiment of the present invention, said mixed metal compound pM comprises Ni, Co and Al. In another preferred embodiment of the present invention, said mixed metal compound pM comprises Ni, Co and Mn.

In a preferred embodiment of the present invention, said mixed metal compound pM is according to general formula (I), lithium and the counterion(s) being omitted for clarity:

$$Ni_x M''_y Co_z E_d \qquad (I)$$

wherein x is in the range of from 0.15 to 0.95, preferably from 0.30 to 0.92, more preferably from 0.50 to 0.90, and most preferably from 0.60 to 0.85; wherein y is in the range of from 0.00 to 0.80, preferably from 0.01 to 0.60, and more preferably from 0.05 to 0.20; wherein z is in the range of from 0.00 to 0.40, preferably from 0.01 to 0.30, preferably from 0.02 to 0.10; and wherein d is in the range of from 0.00 to 0.10, preferably from 0.001 to 0.005; wherein with M'' is one or both of Mn or Al; and wherein E is selected from Ba, Al, Ti, Zr, W, Fe, Cr, K, Mo, Nb, Sr, Mg, Na and V, including combinations thereof, preferably selected from Ba, Al, Ti, Zr, W, Fe, Cr, Mo, Nb, Sr, Mg and V; and wherein x+y+z+d=1, and wherein y+z+d≥0.05, preferably y+z+d≥0.08, and more preferably y+z+d≥0.10. Preferably, E is selected from Al, Mg, W, Ti and Zr and combinations thereof, and more preferably E is selected from Al, Mg and Zr and combinations thereof.

Preferred examples of mixed metal compounds pM according to general formula (I) are selected from $Ni_{1/3}Co_{1/3}Mn_{1/3}$, $Ni_{0.4}Co_{0.2}Mn_{0.4}$, $Ni_{0.5}Co_{0.2}Mn_{0.3}$, $Ni_{0.6}Co_{0.2}Mn_{0.2}$, $(Ni_{0.85}Co_{0.15})_{0.98}Al_{0.02}$, $(Ni_{0.85}Co_{0.15})_{0.97}Al_{0.03}$, $(Ni_{0.85}Co_{0.15})_{0.95}Al_{0.05}$, $Ni_{0.8}Co_{0.1}Mn_{0.1}$, and $Ni_{0.7}Co_{0.2}Mn_{0.1}$, $Ni_{0.2}Co_{0.1}Mn_{0.7}$, $Ni_{0.25}Co_{0.15}Mn_{0.6}$, $(Ni_{0.6}Co_{0.2}Mn_{0.2})_{0.997}Al_{0.003}$, $(Ni_{0.6}Co_{0.2}Mn_{0.2})_{0.998}Al_{0.002}$, $(Ni_{0.7}Co_{0.2}Mn_{0.1})_{0.997}Al_{0.003}$, $(Ni_{0.7}Co_{0.2}Mn_{0.998}Al_{0.002}$, $(Ni_{0.8}Co_{0.1}Mn_{0.1})_{0.997}Al_{0.003}$, $(Ni_{0.8}Co_{0.1}Mn_{0.1})_{0.998}Al_{0.002}$.

Said mixed metal compound pM may contain traces of other metal ions, for example traces of ubiquitous metals such as Na, Ca or Zn, although such traces will not be taken into account in the description of the present invention. The term 'traces' in the context of the present invention refers to amounts of 0.05 mol. % or less, relative to the total metal content of said mixed metal compound pM.

Said mixed metal compound pM may be a monocrystalline product or may be a polycrystalline product. Preferably, said mixed metal compound pM has a polycrystalline structure. The mixed metal compound pM preferably comprises secondary particles formed by a plurality of agglomerated primary particles. The particle shape of the secondary particles of the mixed metal compound pM is preferably spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, the mixed metal compound pM is provided as spherical secondary particles that are agglomerates of primary particles. Even more preferably, the mixed metal compound pM is provided as spherical secondary particles that are agglomerates of spherical primary particles or platelets.

In a second aspect, the present invention provides a secondary lithium-ion battery comprising a positive electrode active material obtained by a process according to the first aspect of the invention.

This objective of the present invention is achieved by providing a process for preparing a positive electrode active material powder having a general formula $Li_{(1+a)}(Ni_xMn_yCo_zMe_c)_{(1-a)}O_2$, wherein Me comprises at least one element of the group consisting of Al, Mg, Ti, Zr, W, Nb, B, and Sr, with −0.1≤a≤0.1, 0.33≤x≤0.95, 0≤y≤0.35, 0≤z≤0.35, 0≤c≤0.05, and x+y+z+c=1, said process comprising a sintering step having a predefined sintering time and a predefined sintering temperature, wherein the predefined time t, expressed in hours, is 0.3≤t≤6.0, and the predefined temperature T, expressed in ° C., is 1140+50 $Log_{10}$ (6/t)−580 x≤T≤1245+50 $Log_{10}$ (6/t)−580 x. With respect to the above combination of features, a range of 0.33≤x≤0.90 is preferred.

The suffixes a, x, y, z, and c are expressed as atomic ratios.

It is indeed observed that a satisfactory first discharge capacity more than 175 mAh/g is obtained, as illustrated in Table 1, EX1-01, when a product is prepared according to a process wherein:
the sintering time t is 0.33 hour;
the Ni content x is 0.60; and,
the sintering temperature T is 940° C.

Also, the generally desired presence of secondary particles that are agglomerates of primary particles, or so-called "polycrystalline NMC", is observed.

The sintering temperature T, expressed in ° C., is defined as a highest dwelling temperature during the firing step. The dwelling temperature means a temperature at which a target powder stays longer than 30% of total sintering time.

A sintering time t, expressed in hours, is defined as the time a target powder stays above a temperature susceptible to entrain sintering, which is defined as 650° C.

Both a sintering temperature and a sintering time are key process parameters in the manufacturing process of powderous NMC materials. Decent electrochemical properties such as a high first discharge capacity of the powderous NMC materials can be achieved when the powderous NMC materials have a proper crystallite size. The crystallite size is mainly controlled by the sintering temperature and sintering time.

The range of the sintering temperature is from 1140+50 $Log_{10}$ (6/t)−580 x≤T≤1245+50 $Log_{10}$ (6/t)−580 x is the optimized range, leading to the best electrochemical properties of powderous NMC materials. If the sintering temperature is higher or lower than the range of the sintering temperature in this invention, the electrochemical properties, such as the first discharge capacity, is degraded.

Ni has been found to promote sintering. Therefore, a lower sintering temperature suffices to achieve the optimized crystallite size when the NMC material has a higher Ni content. For example, the lowest sintering temperature T for a material composition according to $LiNi_{0.34}Mn_{0.33}Co_{0.33}O_2$ is 958° C., while that of $LiNi_{0.60}Mn_{0.20}Co_{0.20}O_2$ is 807° C., assuming a sintering time t of 3 hours.

The short sintering times are rendered possible thanks to:
the insight that higher temperatures promote faster kinetics, and that this still leads to electrochemically performant products;
the optimization of the sintering time in function of the Ni content.

A sintering time less than 0.3 hour is on the other hand not desirable. Such an extremely short sintering time would indeed require even higher sintering temperatures. This could lead to the evaporation of Li, resulting in an undesirable Li stoichiometry.

In a first embodiment, the present invention provides a process for preparing a positive electrode active material powder having a general formula $Li_{(1+a)}(Ni_xMn_yCo_zMe_c)_{(1-a)}O_2$, wherein Me comprises at least one element of the group consisting of Al, Mg, Ti, Zr, W, Nb, B, and Sr, with −0.1≤a≤0.1, 0.33≤x≤0.95, 0≤y≤0.35, 0<z≤0.35, 0≤c≤0.05, and x+y+z+c=1, said process comprising a sintering step having a predefined sintering time and a predefined sintering temperature, wherein the predefined time t, expressed in hours, is 0.3≤t≤6.0, and the predefined temperature T, expressed in °C., is 1140+50 $\text{Log}_{10}$ (6/t)−580 x≤T≤1245+50 $\text{Log}_{10}$ (6/t)−580 x.

By the term "predefined" is meant that the operating temperature and time are determined before the process is started.

In another embodiment, the above process is applied wherein the predefined sintering time t, expressed in hours, is 0.5≤t≤5.0.

In another embodiment, the above process is applied to prepare positive electrode active material powder having a general formula $\text{Li}_{(1+a)}(\text{Ni}_x\text{Mn}_y\text{Co}_z\text{Me}_c)_{(1-a)}\text{O}_2$, wherein −0.01≤a≤0.05, 0.60≤x≤0.95, 0≤y≤0.20, 0<z≤0.20, 0≤c≤0.05, and x+y+z+c=1, and wherein the predefined temperature T, expressed in °C., is 1175+50 $\text{Log}_{10}$ (6/t)−580 x≤T≤1245+50 $\text{Log}_{10}$ (6/t)−580 x.

In another embodiment, the above process is applied for the preparation of positive electrode active material powder having a crystallite size between 34 nm and 46 nm are obtained.

The following measurement method relates to X-ray diffraction.

The X-ray diffraction pattern of a powder sample is collected with a Rigaku X-Ray Diffractometer (Ultima IV) using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 185 mm. Diffraction patterns are obtained in the 2θ range from 15° to 85°, with a scan speed of 0.1° per minute and a step-size of 0.02° per scan.

The crystallite size, expressed in nm, is calculated from the diffraction angle and the full width at half maximum (FWHM) of the peak corresponding to the (104) plane obtained from the X-ray diffraction pattern using the Scherrer equation crystallite size (nm)=Kλ/(β cos θ), wherein:

K is the Sherrer constant (K=0.9);
λ is the X-ray wavelength (CuKα=1.5418 Å);
β is the FWHM, expressed in °; and,
θ is half of 2θ, where 2θ is the center of the peak, expressed in rad. (radian).

The peak of the (104) plane assigned to a crystal structure with space group R-3m is observed at about 44.5±1° in an X-ray diffraction pattern. θ and β are obtained by a nonlinear curve fitting method in Origin 9.1 with the Lorentz model in the 2θ range from 43° to 46°. The contribution of Kα-2 is not subtracted.

$\text{LaB}_6$ (Lanthanum hexaboride) is used as a standard material in order to calibrate an instrumental broadening of diffraction peaks. The (011) peak in the range from 28° to 32° of the $\text{LaB}_6$ powder has β of 0.1264° and 2θ (center of the peak) of 30.3719°. The (111) peak in the range from 36° to 39° of the $\text{LaB}_6$ powder has β of 0.1357° and 2θ(center of the peak) of 37.4318°. Therefore, the calculated crystallite sizes from the (011) peak and (111) peak of the $\text{LaB}_6$ powder are 65.2 nm and 61.9 nm, respectively. Since the instrumental peak broadening affects β (FWHM) significantly, the instrument should be calibrated so as to provide abovementioned crystallite sizes of $\text{LaB}_6$ powder.

The following evaluation method relates to the preparation of coin cells.

A slurry that contains the solids: a powderous NMC material, a conductor (Super P, Timcal) and a binder (KF #9305, Kureha) in a weight ratio 90:5:5, and a solvent (NMP, Sigma-Aldrich) are mixed in a high-speed homogenizer so as to obtain a homogenized slurry. The homogenized slurry is spread on one side of an aluminum foil using a doctor blade coater with a 230 μm gap. the slurry-coated aluminum foil is dried in an oven at 120° C., then pressed using a calendaring tool, and dried again in a vacuum oven to remove the solvent completely.

A coin cell is assembled in a glovebox which is filled with an inert gas (argon). For the discharge capacity analysis, a separator (Cellgard) is located between the positive electrode and a piece of lithium foil used as a negative electrode. 1 M $\text{LiPF}_6$ in EC:DMC (1:2 in volume) is used as electrolyte and dropped between separator and electrodes. Then, the coin cell is completely sealed to prevent leakage of electrolyte.

The first charge and discharge capacities (CQ1 and DQ1) are measured in a constant current mode with 0.1 C rate, where 1 C is defined as 160 mAh/g, the charge cut-off voltage is 4.30 V, and the discharge cut-off voltage is 3.0 V.

Example 1

A mixed nickel manganese cobalt oxy-hydroxide powder (MTH1) having general formula $\text{Ni}_{0.60}\text{Mn}_{0.20}\text{Co}_{0.20}\text{O}_{0.15}(\text{OH})_{1.85}$ is prepared by a co-precipitation process in a large-scale continuous stirred tank reactor (CSTR) with a mixed nickel manganese cobalt sulfate solution, sodium hydroxide solution, and ammonia solution. MTH1 and $\text{LiOH·H}_2\text{O}$ are mixed so as to obtain a first mixture (M1) having a Li/(Ni+Mn+Co) atomic ratio of 1.01. The first mixture (M1) is heated at 800° C. for 10 hours under a flow of oxygen as a first calcination step (heating and reaction step) so as to obtain a first intermediate product (INP1). The intermediate product INP1 is allowed to cool down to room temperature.

Intermediate product INP1 is subsequently heated from room temperature to 940° C. in a period of 1 hour. An alumina crucible containing 25 g of the first intermediate product (INP1) is sintered in a furnace heated to 940° C. (sintering temperature $T_s$) for 0.33 hour (sintering time $t_s$). The sintered powder (SP1) is cooled down and grinded to separate agglomerated particles so as to obtain a powderous polycrystalline NMC material EX1-01 having a general formula $\text{Li}_{(1+a)}(\text{Ni}_{0.60}\text{Mn}_{0.20}\text{Co}_{0.20})_{(1-a)}\text{O}_2$ with a=0.005.

Powderous NMC materials EX1-02, EX1-03, EX1-04, EX1-05, and EX1-06 are prepared according to the same method as EX1-01, except that sintering temperatures and sintering times according to Table 1 are applied.

The process to prepare EX1-01 to EX1-06 are according to the present invention.

Comparative Example 1

Powderous NMC materials CEX1-01, CEX1-02, CEX1-03, CEX1-04, CEX1-05, and CEX1-06 are prepared according to the same method as EX1-01 except that sintering temperatures and sintering times according to Table 1 are used in the sintering step.

The processes to prepare CEX1-01 to CEX1-06 are not according to the present invention.

Example 2

A mixed nickel manganese cobalt oxy-hydroxide powder (MTH2) having a general formula $\text{Ni}_{1/3}\text{Mn}_{1/3}\text{Co}_{1/3}\text{O}_{0.33}(\text{OH})_{1.67}$ is prepared by a co-precipitation process in a large-scale continuous stirred tank reactor (CSTR) with a mixed nickel manganese cobalt sulphate solution, sodium hydroxide solution, and ammonia solution. MTH2 and LiOH·H$_2$O are mixed so as to obtain a first mixture (M2) having a Li/(Ni+Mn+Co) atomic ratio of 1.10. The first mixture (M2) is heated at 700° C. for 10 hours under a flow of oxygen as a first calcination step (heating and reaction step) so as to obtain a first intermediate product (INP2).

An alumina crucible containing 10 g of the first intermediate product (INP2) is sintered in a furnace heated to 990° C. (sintering temperature T$_s$) is 990° C. for 1 hour (sintering time t$_s$). The sintered powder (SP2) is cooled down and grinded to separate agglomerated particles so as to obtain a powderous NMC material EX2 having a general formula Li$_{(1+a)}$(Ni$_{1/3}$Mn$_{1/3}$Co$_{1/3}$)$_{(1-a)}$O$_2$.

The process to prepare EX2 is according to the present invention.

Comparative Example 2

Powderous NMC material CEX2 is prepared according to the same method as EX2, except that the sintering time according to Table 1 is used in the sintering step.

The process to prepare CEX2 is not according to the present invention.

Table 1 shows the sintering conditions to prepare powderous NMC materials and their physical, chemical, and electrochemical properties. The powderous NMC materials in Example 1 and Comparative Example 1 (EX1-01 to EX1-06 and CEX1-01 to CEX1-06) have a same general formula Li$_{(1+a)}$(Ni$_{0.60}$Mn$_{0.20}$Co$_{0.20}$)$_{(1-a)}$O$_2$ with a=0.005.

CEX1-05 is prepared according to conventional sintering conditions at a sintering temperature T$_s$ of 860° C. and using a sintering time is of 10 hours. CEX1-05 is considered as a satisfactory powderous NMC material, having a good discharge capacity of 174.5 mAh/g, and also having a suitable crystallite size of 40 nm. It is demonstrated that powderous NMC materials having crystallite sizes of 40±1 nm can be prepared using a much shorter sintering time, such as 0.33 hour (EX1-01), 1 hour (EX1-02), and 3 hours (EX1-05) at 940° C., 910° C., and 880° C., respectively. The powderous NMC materials prepared according to the present invention EX1-01, EX1-02, and EX1-05 have a first discharge capacities (DQ1) that is at least as high that of CEX1-05, in spite of a much shorter sintering time.

The optimal range of the crystallite size of powderous polycrystalline NMC materials is from 34 nm to 46 nm. When the sintering time is less than 0.30 hour (in case CEX1-01 and CEX1-03), it is observed that the crystallite sizes are lower than 34 nm, in spite of the relatively higher sintering temperatures. Since the sintering temperature of CEX1-02 is higher than the upper sintering temperature limit according to the present invention, the crystallite size of CEX1-02 (50 nm) is larger than optimum.

The powderous NMC materials in Example 2 and Comparative Example 2 (EX2 and CEX2) have a same general formula Li$_{(1+a)}$(Ni$_{1/3}$Mn$_{1/3}$Co$_{1/3}$)$_{(1-a)}$O$_2$ with a=0.050. Since the Ni content x is much lower in Example 1, a higher sintering temperature is required to have a same crystallite size according to the present invention. Since the sintering time of CEX2 is less than 0.30 hour, the crystallite size of CEX2 is smaller than optimum.

TABLE 1

Sintering conditions, crystallite size, and DQ1 of Examples.

| NMC ID | Ni content x | Sintering temperature T$_S$ (° C.) | Sintering time t$_S$ (hour) | XRD Crystallite size (nm) | Coin cell DQ1 (mAh/g) |
|---|---|---|---|---|---|
| CEX1-01 | 0.60 | 940 | 0.10 | 28 | |
| EX1-01 | 0.60 | 940 | 0.33 | 41 | 175.5 |
| CEX1-02 | 0.60 | 940 | 1.00 | 50 | |
| CEX1-03 | 0.60 | 910 | 0.10 | 29 | |
| EX1-02 | 0.60 | 910 | 1.00 | 40 | 175.3 |
| EX1-03 | 0.60 | 910 | 3.00 | 46 | |
| EX1-04 | 0.60 | 880 | 1.00 | 36 | |
| EX1-05 | 0.60 | 880 | 3.00 | 39 | 175.0 |
| CEX1-04 | 0.60 | 880 | 10.00 | 42 | |
| EX1-06 | 0.60 | 860 | 3.00 | 36 | |
| CEX1-05 | 0.60 | 860 | 10.00 | 40 | 174.5 |
| CEX1-06 | 0.60 | 860 | 30.00 | 42 | |
| CEX2 | 0.33 | 990 | 0.25 | 33 | |
| EX2 | 0.33 | 990 | 1.00 | 42 | |

The invention claimed is:

1. A process for preparing a positive electrode material for lithium-ion batteries comprising the steps of:
   step (i) heating a mixed metal compound pM comprising lithium, nickel and at least one metal selected from cobalt, manganese and aluminium or a first mixture M1 comprising A1: a mixed metal compound P1 comprising nickel and at least one metal selected from cobalt, manganese and aluminium and B1: a lithium compound L1, in a furnace from a temperature below 200° C. to a temperature T$_s$;
   step (ii) subjecting said mixed metal compound pM or said first mixture to a heat treatment at said temperature T$_s$ for a period of time t$_s$ of 0.3 h to 6.0 h, thereby obtaining a heat-treated mixed metal compound M; wherein said temperature T$_s$ and said period of time t$_s$ relate according to formula: 1140+50·log$_{10}$(6/t$_s$)−580·x≤T$_s$≤1200, wherein x is a fraction by atom of nickel, relative to the total amount of nickel, cobalt, manganese and aluminium in said mixed metal compound pM or in said first mixture, wherein 0.30≤x≤0.99, and wherein 300° C.·h≤T$_s$·t$_s$<3000° C.·h;
   step (iii) cooling said heat-treated mixed metal compound M obtained from step (ii);
   wherein a total period of time for step (i) and step (ii) is from 0.3 hours to 12.0 hours.

2. Process according to claim 1, wherein a total period of time for step (i) and step (ii) is from 0.5 h to 8.0 h.

3. Process according to claim 2, wherein a total period of time for step (i) and step (ii) is from 1.0 h to 3.0 h.

4. Process according to claim 1, wherein t$_s$ is from 0.5 h to 2.0 h.

5. Process according to claim 1, wherein 300° C.·h≤T$_s$ and t$_s$≤2800° C.·h.

6. Process according to claim 1, wherein a period of time t for heating said mixed metal compound pM in step (i) is from 0.3 h to 6 h.

7. Process according to claim 1, wherein said mixed metal compound pM is obtained by heating a second mixture M2 comprising A2: a mixed metal compound P2 comprising nickel and at least one metal selected from cobalt, manganese and aluminium and B2: a lithium compound L2.

8. Process according to claim 1, wherein said heat-treated mixed metal compound M obtained from step (ii) is evacuated from said furnace prior to step (iii).

9. Process according to claim 1, wherein said heat-treated mixed metal compound M obtained from step (ii) is cooled at an average cooling rate from 4° C./min. to 20° C./min.

10. Process according to claim 1, wherein said mixed metal compound pM is provided in step (i) as a powder.

11. Process according to claim 1, wherein $T_s \leq 1745 + 50 \cdot \log_{10}(6/t_s) - 580 \cdot x$.

12. Process according to claim 1, wherein $1170 + 50 \cdot \log_{10}(6/t_s) - 580 \cdot x \leq T_s$.

13. Process according to claim 1, for the preparation of positive electrode active material powder having a crystallite size between 34 nm and 46 nm.

14. Process according to claim 1, for preparing a positive electrode active material powder having a general formula $Li_{(1+a)}(Ni_xMn_yCo_zMe_c)_{(1-a)}O_2$, wherein Me comprises at least one element selected from the group consisting of Al, Mg, Ti, Zr, W, Nb, B, and Sr, with $-0.1 \leq a \leq 0.1$, $0.33 \leq x \leq 0.95$, $0 \leq y \leq 0.35$, $0 < z \leq 0.35$, $0 \leq c \leq 0.05$, and $x+y+z+C=1$, said process comprising a sintering step having a predefined sintering time and a predefined sintering temperature, wherein the predefined time $t_s$, expressed in hours, is $0.3 \leq t_s \leq 6.0$, and the predefined temperature $T_s$, expressed in ° C., is $1140 + 50 \log_{10}(6/t_s) - 580 \cdot x \leq T_s \leq 1245 + 50 \log_{10}(6/t_s) - 580 \cdot x$.

15. A secondary lithium-ion battery comprising a positive electrode active material obtained by a process according to claim 1.

* * * * *